(12) United States Patent
Hodges et al.

(10) Patent No.: US 9,710,816 B2
(45) Date of Patent: Jul. 18, 2017

(54) METHOD AND SYSTEM OF MEASURING CUSTOMER SATISFACTION WITH PURCHASED VEHICLE

(75) Inventors: Peter H. Hodges, Livonia, MI (US); Shuh-Yuan Liou, Troy, MI (US)

(73) Assignee: Ford Motor Company, Dearborn, MI (US)

( * ) Notice: Subject to any disclaimer, the term of this patent is extended or adjusted under 35 U.S.C. 154(b) by 2026 days.

(21) Appl. No.: 12/185,870

(22) Filed: Aug. 5, 2008

(65) Prior Publication Data

US 2010/0036709 A1 Feb. 11, 2010

(51) Int. Cl.
*G06Q 30/02* (2012.01)

(52) U.S. Cl.
CPC ......... *G06Q 30/02* (2013.01); *G06Q 30/0203* (2013.01)

(58) Field of Classification Search
CPC ................................. G06F 17/30654
USPC ....... 701/300; 704/270, 270.1, 275; 165/298
See application file for complete search history.

(56) References Cited

U.S. PATENT DOCUMENTS

| | | | |
|---|---|---|---|
| 6,278,986 B1 | 8/2001 | Kamihira et al. | |
| 6,925,425 B2 | 8/2005 | Remboski et al. | |
| 6,946,966 B2 | 9/2005 | Koenig | |
| 7,149,653 B2 | 12/2006 | Bihler et al. | |
| 7,529,411 B2 * | 5/2009 | Haupt et al. | 382/220 |
| 2004/0001616 A1 * | 1/2004 | Gutta et al. | 382/118 |
| 2005/0030184 A1 | 2/2005 | Victor | |
| 2005/0278093 A1 * | 12/2005 | Kameyama | 701/36 |
| 2007/0265507 A1 * | 11/2007 | de Lemos | 600/300 |
| 2008/0169914 A1 * | 7/2008 | Albertson et al. | 340/438 |
| 2014/0313208 A1 * | 10/2014 | Filev et al. | 345/474 |

FOREIGN PATENT DOCUMENTS

| | | |
|---|---|---|
| WO | 02/096694 A1 | 12/2002 |
| WO | 2007/090896 A1 | 8/2007 |

OTHER PUBLICATIONS

Kari Torkkola et al., "Sensor Selection for Driving State Recognition", 2006 International Joint Conference on Neural Networks, Jul. 16-21, 2006, pp. 4734-4739.

* cited by examiner

*Primary Examiner* — Akiba Allen
(74) *Attorney, Agent, or Firm* — Damian Porcari; Brooks Kushman P.C.

(57) ABSTRACT

A method of measuring customer satisfaction with a product. The method may assess customer satisfaction from information collected after purchasing the product. This post-purchase information may be collected, for example, by monitoring customer expressions made while interacting with the product. Optionally, the settings and operating conditions of the product may be separately monitored and cross-referenced with the customer expressions to tie the expressions with specific characteristics of the product.

20 Claims, 1 Drawing Sheet

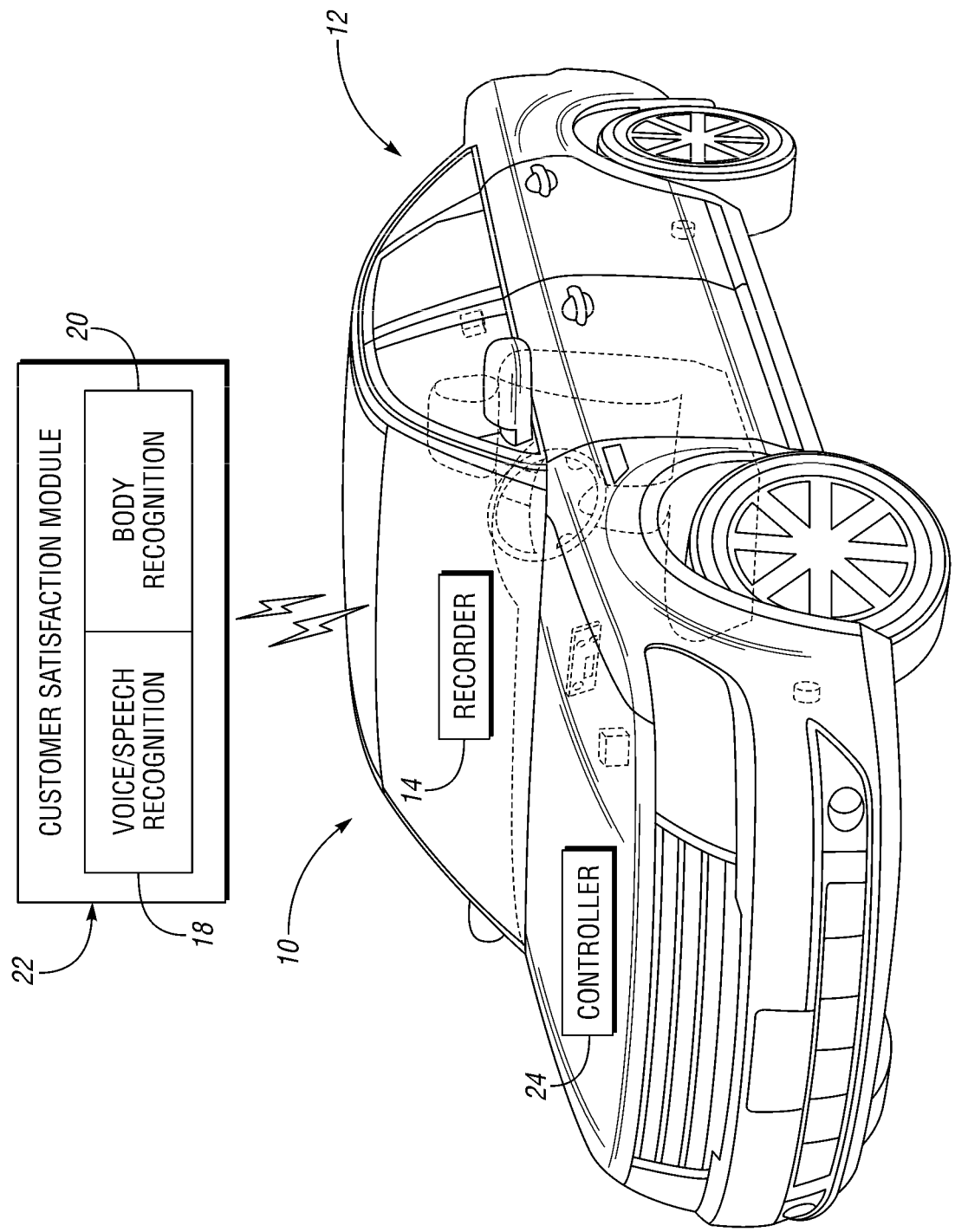

METHOD AND SYSTEM OF MEASURING CUSTOMER SATISFACTION WITH PURCHASED VEHICLE

TECHNICAL FIELD

The present invention relates to methods and systems of measuring customer satisfaction with a vehicle after the customer purchases the vehicle and has spent a sufficient period of time within the vehicle to become properly acquainted with its performance.

BACKGROUND

Customer satisfaction with product purchases can provide valuable information to product manufactures. Customer surveys can be mailed to recent product purchasers to collect information regarding customer satisfaction. The survey can include a number of questions and selectable ratings/answers for each question. Customers can complete the survey by entering their answers and mailing the form back to the manufacturer. The customer responses can be assessed and used to generate customer satisfaction ratings for different features of the product.

DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a system of measuring customer satisfaction in accordance with one non-limiting aspect of the present invention.

DESCRIPTION

FIG. 1 illustrates a system 10 of measuring customer satisfaction in accordance with one non-limiting aspect of the present invention. The system 10 is described with respect to a customer purchased product being an automobile 12. This is done for exemplary purposes and without intending to limit the scope and contemplation of the present invention. The present invention fully contemplates its use with and application to any type of vehicle and any type of product that supports or can be adapted to support the operations necessary to implementing the features of the present invention.

The present invention measures customer satisfaction based on customer expressions made while acting as a passenger or driver within the vehicle 12. The vehicle may include a recording device 14, such as but not limited to a video camera, that records audible and inaudible expressions of the customers. One example of an audible expression may be a statement made by the driver. The statements may be positive statements like 'great' or 'wow' and/or negative statements like 'that was bad' or 'I wish that was better'. The audible expressions may also include non-language sounds of the customer, such as sounds generated by striking a surface, sighs, or other non-translatable comments. One example of an inaudible expression may be gestures and other movements made by the customer, such as but on limited to hand gestures that require extremity movement and/or facial contortions.

The expressions made by the customer may be screened with voice recognition and body recognition modules 18, 20, or other modules having capabilities to support the operations contemplated by the present invention. The modules 18, 20 may assess whether the expressions are positive or negative expressions. Positive expression may be those that can be characterized as indicating approval and the negative expressions may be those that can be characterized as indicating disapproval. The modules 18, 20 may weigh some expressions as being more positive or more negative than others depending on the context, tone, severity, etc. of the expressions.

In some cases, it may be difficult for the modules 18, 20 to accurately assess whether the customer intended the expression to be positive or negative, such as if the customer uses a positive slang expression that speech-recognition inaccurately determines to be a negative expression. An inquiry may be transmitting to the customer to confirm whether the expression was intended to be positive or negative. The inquiry may be displayed via a display (not shown) within the vehicle, an audio prompt, and/or through other means, such as by emailing or contact the customer at a later time. The customer's response to the inquiries may be managed over time to develop a translation or semantic library that can be used with the customer and/or other customer to assess future customer expressions.

The expression assessment modules 18, 20 are shown to be located at a location outside of the vehicle 12. This location may correspond with a customer satisfaction module 22 that is configured to assess customer satisfaction. The customer satisfaction module 22 may be in wireless communication with the vehicle 12. A vehicle controller 24 may coordinate collection and storage of the recorded expression onboard the vehicle 12, such as within a vehicle memory (not shown), for subsequent transfer to the customer satisfaction module 22. The vehicle controller 24 may be programmed through wireless transmissions and/or at the time of purchase to record the expressions and to transmit the information to customer satisfaction module 22.

In addition to programming the vehicle controller 24 to facilitate recording and transmitting the customer expressions, the vehicle controller 24 may be configured to facilitate recording or otherwise collecting state information from any number of vehicle systems (not shown). The state information may relate to settings, operating characteristics, performance, and/or any other measurables that can be ascertained from the vehicle systems. The state information can be transmitted with the customer expressions and used in conjunction with the customer expression information by the customer satisfaction module to assess customer satisfaction.

The vehicle systems that may be monitored may include but are not limited to system that control suspension, anti-lock braking, seat adjustment, entertainment, airbag deployment, engine output, tire inflation, climate, and illumination. The state information may reflect factory or customer selected/controlled settings, conditions, health, and other aspects of the vehicle systems. While the collection of any setting or parameter is contemplate, one non-limiting aspect of the present invention is directed towards collecting non-subjective state information that can be used to accurately measure the actual operating conditions of vehicle during a time period that prompted the occupant to issue one or more of the recorded expressions.

The customer satisfaction module 22 may be configured to correlate the customer expressions with the state information in order to assess customer satisfaction with particular vehicle systems and/or the settings of the vehicle systems. The customer expressions may be recorded while the state information is being recorded to facilitate matching the customer expression with the particular operating characteristics of the vehicle systems. Customer ratings may be generated for each vehicle system and/or for particular features of the vehicle systems. The customer ratings may rank customer satisfaction according to a scaling system that allows for some differentiation/weighting of customer satisfaction.

A customer satisfaction survey may be used to facilitate assessment of the customer experience. Different surveys may be used to assess different features of the vehicle 12. Rather than having the customer directly answer the survey questions, the customer satisfaction module 22 may be configured to generate the answers from the customer expressions and state information. Optionally, the customer may be unaware of the fact that their expressions are being recorded for the purposes of assessing satisfaction with a particular vehicle system or aspect of the system. The customer may be aware that a satisfaction process will monitor their responses but they may be unaware of when the assessment is taking place and/or the particular vehicle system or aspect of the system that is being assessed.

The process contemplated by the present invention may be used to generate customer satisfaction information without the answers being influenced by the subjective thoughts of the customer—at least in so far as the recorded expressions may be more spontaneous representations rather than reasoned handwritten/selected answers. Optionally, the information used to assess customer satisfaction may be determined while the customer is actually using the purchased product for its intended purpose. The state information can be used to enhance the value of the customer satisfaction ratings since it allows the customer expressions to be balanced against non-subjective metrics.

While only a single vehicle 12 is shown, the customer satisfaction module 22 may receive similar information from other vehicles. The customer satisfaction module 22 may then compile the multiple vehicle information and determine customer satisfaction with the vehicle based on expressions received from a corresponding number of customers. The customers being recorded need not be limited to the driver. Rear seat occupants, occupants in baby seats, etc. may be similarly monitored. This can be helpful in assess customer satisfaction as a function of the customer's location within the vehicle.

Once the information is transmitted from the vehicle(s) 12, it may be deleted by the respective vehicle controller 24. This can be helpful in limiting proliferation of the information and storage demands on the vehicle 12. The information collected from the vehicles 12 may be used in any manner. One option may include using the information to adjust operating parameters of the vehicle systems. If a customer expresses displeasure with having the continuously readjust the seat, for example, the seat may be wireless controlled to the more desirable location. Another option may include assessing biological information (heart rate, drowsiness, etc.) of the customer and using that information to adapt operation of one or more of the vehicle systems, such as by generating an alarm for drowsy driver.

The customer satisfaction information/surveys may be particularly useful with product development and/or the development of new products. For example, it can help to identify and enhance safety features. The information can be used when developing new technology to acquire a much richer source of data with a system that correlates real-time subjective and objective responses with objective real-time vehicle response data. Subjective driver and passenger responses such as "that was a hard bump!" can be time correlated with vehicle response (e.g., from accelerometers), vehicle parameter settings (e.g., sport, touring, etc damper settings), and vehicle location (using GPS). This type of data can provide a rich stream of data about customers' responses to vehicle performance is used in the vehicle response (attribute) integration process.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

What is claimed:

1. A method comprising:
    a programmed vehicle controller collecting state information for vehicle systems while a customer rides in a vehicle;
    a recognition module determining expressions of the customer recorded at the time of state information collection to be one of positive and negative; and
    a customer satisfaction module correlating each expression with the state information to determine a customer satisfaction rating for the corresponding vehicle system and wirelessly transmitting instructions to the corresponding vehicle system to adjust a setting thereof according to the expression.

2. The method of claim 1 further comprising the recognition module determining one of the positive and negative expressions from an audible expression.

3. The method of claim 1 further comprising the recognition module determining one of the positive and negative expressions from a visual perceived expression.

4. The method of claim 1 further comprising the programmed vehicle controller transmitting the collected state information and recorded expressions from the vehicle prior to the customer satisfaction module determining the customer satisfaction rating.

5. The method of claim 4 further comprising the programmed vehicle controller wirelessly transmitting the collected state information and recorded expressions to the customer satisfaction module that determines the customer satisfaction rating.

6. The method of claim 5 further comprising the programmed vehicle controller transmitting the collected state information and recorded expressions prior to the customer satisfaction module adjusting operations of the vehicle systems relative to the customer satisfaction rating.

7. The method of claim 1 further comprising the customer satisfaction module determining a number of customer satisfaction ratings for a corresponding number of vehicle systems and the customer satisfaction module determining at least one of the number of customer satisfaction ratings without collecting state information that reflects a customer controlled setting for the corresponding vehicle system.

8. A method comprising:
    a video camera recording a video of a customer riding in a vehicle;

a programmed vehicle controller recording settings for a number of vehicle systems, wherein the customer is unaware of the settings for the number of vehicle systems;

a recognition module automatically screening the video to categorize audible and inaudible expressions of the customer as being positive or negative; and a customer satisfaction module determining customer satisfaction with one or more of the settings based on whether the audible and inaudible expressions were positive or negative and wirelessly transmitting instructions to the corresponding vehicle system to adjust a setting thereof according to the expression.

9. The method of claim 8 further comprising the recognition module determining customer satisfaction based on at least one audible and one inaudible expression.

10. The method of claim 8 further comprising the recognition module determining customer satisfaction based on at least one of the inaudible expressions being a gesture made by the customer that requires moving an extremity.

11. The method of claim 8 further comprising the customer satisfaction module determining customer satisfaction based on at least one of the inaudible expressions being a facial expression.

12. The method of claim 8 further comprising the programmed vehicle controller transmitting the video from the vehicle to a controller operable to issue instructions sufficient to adjust operations of the vehicle systems based on the video before the video is screened.

13. The method of claim 12 further comprising the programmed vehicle controller deleting the video from a memory on the vehicle after the video is transmitted from the vehicle and before the video is screened.

14. The method of claim 13 further comprising the programmed vehicle controller deleting the video before adjusting operations of the vehicle systems relative to the customer satisfaction rating.

15. A method of measuring customer satisfaction with a vehicle comprising:

a video camera recording a video of a customer riding in a vehicle;

a programmed vehicle controller recording settings for a number of vehicle systems;

a recognition module automatically screening the video to categorize audible and inaudible expressions of the customer as being positive or negative; and a customer satisfaction module determining customer satisfaction with one or more of the settings based on whether the audible and inaudible expressions were positive or negative; and the customer satisfaction module transmitting an inquiry to the customer to confirm whether the audible and inaudible expressions were positive or negative, and the customer satisfaction module wirelessly transmitting instructions to the corresponding vehicle system to adjust a setting thereof according to the expression.

16. The method of claim 15 further comprising the customer satisfaction module adjusting one or more customer satisfaction ratings based on a response of the customer to the inquiry.

17. The method of claim 15 further comprising the customer satisfaction module limiting the inquiry to new audible or inaudible expressions.

18. The method of claim 15 further comprising the customer satisfaction module inputting the customer ratings in a customer survey and transmitting the survey as the inquiry to the customer.

19. The method of claim 15 further comprising the customer satisfaction module transmitting the inquiry via display in the vehicle proximate in time to occurrence of the audible and inaudible expressions.

20. The method of claim 1 wherein the state information identifies settings for each of the vehicle systems, and wherein at least one of the customer ratings corresponds with at least one vehicle system having settings that are unknown to the customers such that the corresponding customer rating reflects customer satisfaction with the unknown settings.

* * * * *